US010637279B2

(12) United States Patent
Heber et al.

(10) Patent No.: US 10,637,279 B2
(45) Date of Patent: Apr. 28, 2020

(54) METHOD OF MITIGATING EFFECTS OF AC INPUT VOLTAGE SURGE IN A TRANSFORMER-LESS RECTIFIER UNINTERRUPTIBLE POWER SUPPLY SYSTEM

(71) Applicant: Liebert Corporation, Columbus, OH (US)

(72) Inventors: Brian P. Heber, Delaware, OH (US); Xian Chen, Columbus, OH (US)

(73) Assignee: Vertiv Corporation, Columbus, OH (US)

( * ) Notice: Subject to any disclaimer, the term of this patent is extended or adjusted under 35 U.S.C. 154(b) by 276 days.

(21) Appl. No.: 15/880,960

(22) Filed: Jan. 26, 2018

(65) Prior Publication Data

US 2018/0241246 A1    Aug. 23, 2018

Related U.S. Application Data

(60) Provisional application No. 62/461,914, filed on Feb. 22, 2017.

(51) Int. Cl.
| | |
|---|---|
| *H02H 9/00* | (2006.01) |
| *H02J 9/06* | (2006.01) |
| *H02H 9/04* | (2006.01) |
| *H02M 7/12* | (2006.01) |
| *H02M 7/487* | (2007.01) |
| *H02M 5/458* | (2006.01) |

(52) U.S. Cl.
CPC ............. *H02J 9/061* (2013.01); *H02H 9/045* (2013.01); *H02M 7/125* (2013.01); *H02M 5/4585* (2013.01); *H02M 7/487* (2013.01)

(58) Field of Classification Search
None
See application file for complete search history.

(56) References Cited

U.S. PATENT DOCUMENTS

| | | | |
|---|---|---|---|
| 5,684,686 A | 11/1997 | Reddy | |
| 6,295,215 B1 | 9/2001 | Faria et al. | |
| 6,605,879 B2 * | 8/2003 | Wade ..................... | H02J 9/062 307/66 |
| 6,950,321 B2 | 9/2005 | Stancu et al. | |
| 7,324,354 B2 | 1/2008 | Joshi et al. | |
| 7,352,083 B2 | 4/2008 | Nielsen et al. | |
| 7,456,524 B2 | 11/2008 | Nielsen et al. | |
| 7,684,222 B2 | 3/2010 | Paatero | |

(Continued)

*Primary Examiner* — Stephen W Jackson
(74) *Attorney, Agent, or Firm* — Harness, Dickey & Pierce, P.L.C.

(57) ABSTRACT

Effects of a surge in an AC input voltage to a UPS is mitigated. If the AC input voltage is overvoltage, the rectifier is operated using a DC bus target voltage for the DC bus voltage unless the rectifier reaches its current limit. If the rectifier reaches its current limit, the DC bus target voltage is increased by a predetermined amount which is used as a current DC bus target voltage unless the increased DC bus target voltage exceeds a maximum DC bus voltage limit in which case the current DC bus target voltage is set to the maximum DC bus voltage limit. The rectifier is then operated using the current DC bus target voltage until it reaches its current limit or the AC input voltage surge has passed. If the rectifier again reaches its current limit, the above steps starting with increasing the DC bus target voltage are repeated.

2 Claims, 4 Drawing Sheets

(56) References Cited

U.S. PATENT DOCUMENTS

| | | |
|---|---|---|
| 8,093,746 B2 | 1/2012 | Murali Dora et al. |
| 8,344,551 B2 | 1/2013 | Nielsen |
| 8,842,452 B2 | 9/2014 | Nielsen |
| 9,214,874 B2 | 12/2015 | Kolhatkar et al. |
| 9,300,171 B2 | 3/2016 | Moth |
| 2005/0105229 A1 | 5/2005 | Deng et al. |
| 2006/0043797 A1 | 3/2006 | Hjort et al. |
| 2013/0258725 A1 | 10/2013 | Colombi et al. |
| 2015/0137595 A1 | 5/2015 | Xu et al. |
| 2016/0013728 A1 | 1/2016 | Giuntini et al. |
| 2016/0211784 A1 | 7/2016 | Fujisawa et al. |

\* cited by examiner

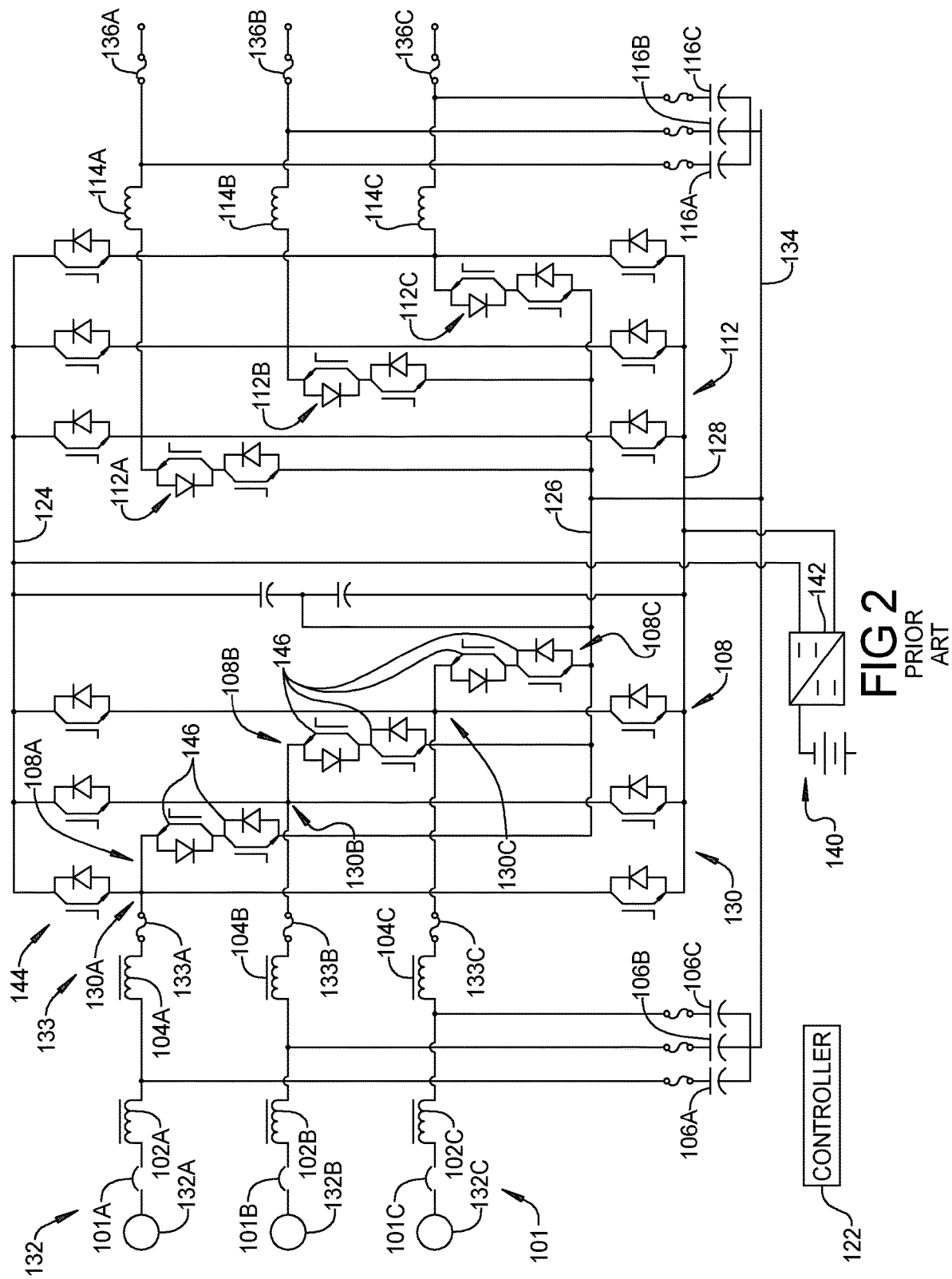

US 10,637,279 B2

METHOD OF MITIGATING EFFECTS OF AC INPUT VOLTAGE SURGE IN A TRANSFORMER-LESS RECTIFIER UNINTERRUPTIBLE POWER SUPPLY SYSTEM

CROSS-REFERENCE TO RELATED APPLICATIONS

This application claims benefit of U.S. Patent Application No. 62/461,914 filed on Feb. 22, 2017. The entire disclosure of the above application is incorporated herein by reference.

FIELD

The present disclosure relates to mitigating the effects of AC input voltage surges in UPS system having a transformer-less rectifier.

BACKGROUND

This section provides background information related to the present disclosure which is not necessarily prior art.

One common type of uninterruptible power supply (UPS) system is a double conversion UPS system that has a rectifier that converts AC input power to DC power that is provided via a DC bus to an inverter that converts the DC power back to AC power. A circuit breaker is coupled between an AC power input and an input of the rectifier. The AC power input is coupled to a source of AC power, such as a power feed from a utility. An LC input circuit is coupled between an AC input of the rectifier and the circuit breaker and a fuse is typically coupled between the AC input of the rectifier and the LC circuit. In this regard, if the UPS system is a three-phase system, the rectifier has three AC inputs and the circuit breaker has three poles and a respective LC input circuit is coupled between each pole of the circuit breaker and a respective one of the AC inputs of the rectifier. One type of double conversion UPS system does not have an input transformer coupled between the AC input of the rectifier and the AC power input and is referred to herein as a transformer-less rectifier UPS system. It should be understood that such transformer-less rectifier UPS system can have a transformer coupled between an output of the inverter and an output of the UPS system or not have a transformer coupled between the output of the inverter and the output of the UPS system.

FIG. 1 is a basic block diagram of a typical prior art 3-wire transformer-less double conversion UPS system 100 where the power sources to which the rectifier and bypass switch are coupled are separate power sources. UPS system 100 includes circuit breakers 101, 103, common mode choke 102, a rectifier input inductor 104, a rectifier input capacitor 106, a three phase rectifier 108, a DC bus 110, a three phase inverter 112, an inverter output inductor 114, an inverter output capacitor 116, a battery (not shown), a bypass switch 120, and a control module 122. DC bus 110 is a split DC bus having a high rail 124, a mid-point rail 126 and a low rail 128 that are coupled to corresponding power outputs of rectifier 108 and power inputs of inverter 112. An input 130 of rectifier 108 is coupled through a fuse 133, rectifier input inductor 104 and common mode choke 102 to an AC power source 132 (such as a utility feed). A battery 140 is coupled to an input/output of one side of a DC/DC converter 142 and an input/output of another side of DC/DC converter 142 is coupled to high rail 124 of DC bus 110 and low rail 128. Rectifier input capacitor 106 is coupled between a junction of common mode choke 102 and rectifier input inductor 104 and a common 134 (which floats about ground but is not directly connected to ground). An output 135 of inverter 112 is coupled through inverter output inductor 114 through an over current protection device 136 (such as a fuse) to load 138. Inverter output capacitor 116 is coupled between a junction of inverter output inductor 114 and over current protection device 136 and common 134. Control module 122 is coupled to bypass switch 120, rectifier 108 and inverter 112. It should be understood that the AC power source 132 and circuit breaker 101 are not part of UPS system 100 but are typically are a power feed such as from a utility and circuit breaker therefor.

FIG. 2 is a basic schematic showing the double conversion portion of UPS system 100 in more detail. As can be seen from FIG. 2, each of the three phases (A, B and C) includes a respective common mode choke 102 (designated $102_A$, $102_B$, $102_C$), a respective rectifier input inductor 104 (designated $104_A$, $104_B$, $104_C$), a respective rectifier input capacitor 106 (designated $106_A$, $106_B$, $106_C$), a respective rectifier input fuse 133 (designated $133_A$, $133_B$, $133_C$) a respective inverter output inductor 114 (designated $114_A$, $114_B$, $114_C$), a respective inverter output capacitor 116 (designated $116_A$, $16_B$, $116_C$) and an over current protection device 136 (designated $136_A$, $136_B$, $136_C$). The three phases of three phase rectifier 108 are designated $108_A$, $108_B$, $108_C$) and the three phases of three phase inverter 112 are designated 112A, $112_B$, $112_C$. A respective input 130 (designated $130_A$, $130_B$, $130_C$) of each rectifier phase is coupled to a respective phase (designated $132_A$, $132_B$, $132_C$) of AC power source 132. DC bus 110, comprised of high rail 124, mid-point rail 126 and low rail 128, is a common DC bus for the three phases.

In a transformer-less UPS system, the rectifier typically has IGBT switching devices and the circuit topology will thus have diodes at its front end as shown in FIG. 2. In FIG. 2, rectifier front end circuit topology 144 is a Neutral Point Clamped (NPC2) rectifier topology. Three phase rectifier 108 has IGBT switching devices 146. The IGBT switching devices 146 are connected in three sets of four IGBT switching devices 146, one set for each of the three phases $108_A$, $108_B$, $108_C$ of rectifier 108.

In a transformer-less rectifier UPS system, when power from a utility feeding the UPS system is lost, the input circuit breaker remains closed and the rectifier is off. When power from the utility is restored, or a back-up AC generator kicks-in, there is sometimes a large surge in the AC input voltage to the rectifier. This surge pumps up the DC voltage on the DC bus of the UPS system through anti-parallel diodes of the rectifier, the anti-parallel diodes of IGBT switching devices 146 for example, to a much higher level than the normal DC voltage of the DC bus which can cause damage to other components of the UPS system connected to the DC bus. This problem exists in any diode-front end rectifier of a transformer-less rectifier UPS system that has neutral point clamped topology (NPC1 or NPC2 topology) and any rectifier using other types of switching devices that have anti-parallel diodes.

SUMMARY

This section provides a general summary of the disclosure, and is not a comprehensive disclosure of its full scope or all of its features.

A transformerless-rectifier uninterruptible power supply system includes a DC bus with an associated DC bus target voltage. In accordance with an aspect of the present disclosure, a method of mitigating effects of an AC input voltage surge to a rectifier of the transformer-less rectifier uninterruptible power supply system that occurs when AC power is restored to an input of the rectifier after an outage includes determining with a controller if the AC input voltage is overvoltage and if the AC input voltage is not overvoltage, have the rectifier operated normally. If the AC input is overvoltage: (i) operating the rectifier with the controller regulate a DC bus voltage to be at the DC bus target voltage until the voltage surge has passed unless the controller determines that the rectifier has reached a current limit of the rectifier; (ii) if the rectifier has reached the current limit of the rectifier, increasing the DC bus target voltage with the controller by a predetermined amount, then determining with the controller if the DC bus target voltage as increased exceeds a maximum voltage limit of the DC bus and if DC bus target voltage as increased exceeds the maximum voltage limit of the DC bus then setting with the controller the DC bus target voltage to be the maximum voltage limit of the DC bus and if the DC bus target voltage as increased does not exceed the maximum voltage limit of the DC bus then leaving the DC bus target voltage as increased as the DC bus target voltage; (iii) next operating the rectifier to regulate the DC bus at the DC bus target voltage for a predetermined period of time; and (iv) after the predetermined period of time, checking with the controller if the AC voltage input is still overvoltage and if the AC input voltage is still overvoltage, repeating steps (i)-(iv), and if the AC input voltage is no longer overvoltage, controlling the rectifier with the controller to ramp the DC bus voltage down to a nominal DC voltage and then having the rectifier operated normally.

In an aspect, if the AC input voltage is overvoltage when AC power is first restored, the method further includes having the controller operate the rectifier to have a fast start and have a DC/DC converter of the uninterruptible power supply system in a charge mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a basic schematic of the double conversion portion of the UPS system of FIG. 1.

Corresponding reference numerals indicate corresponding parts throughout the several views of the drawings.

DETAILED DESCRIPTION

Example embodiments will now be described more fully with reference to the accompanying drawings.

Figure 1:
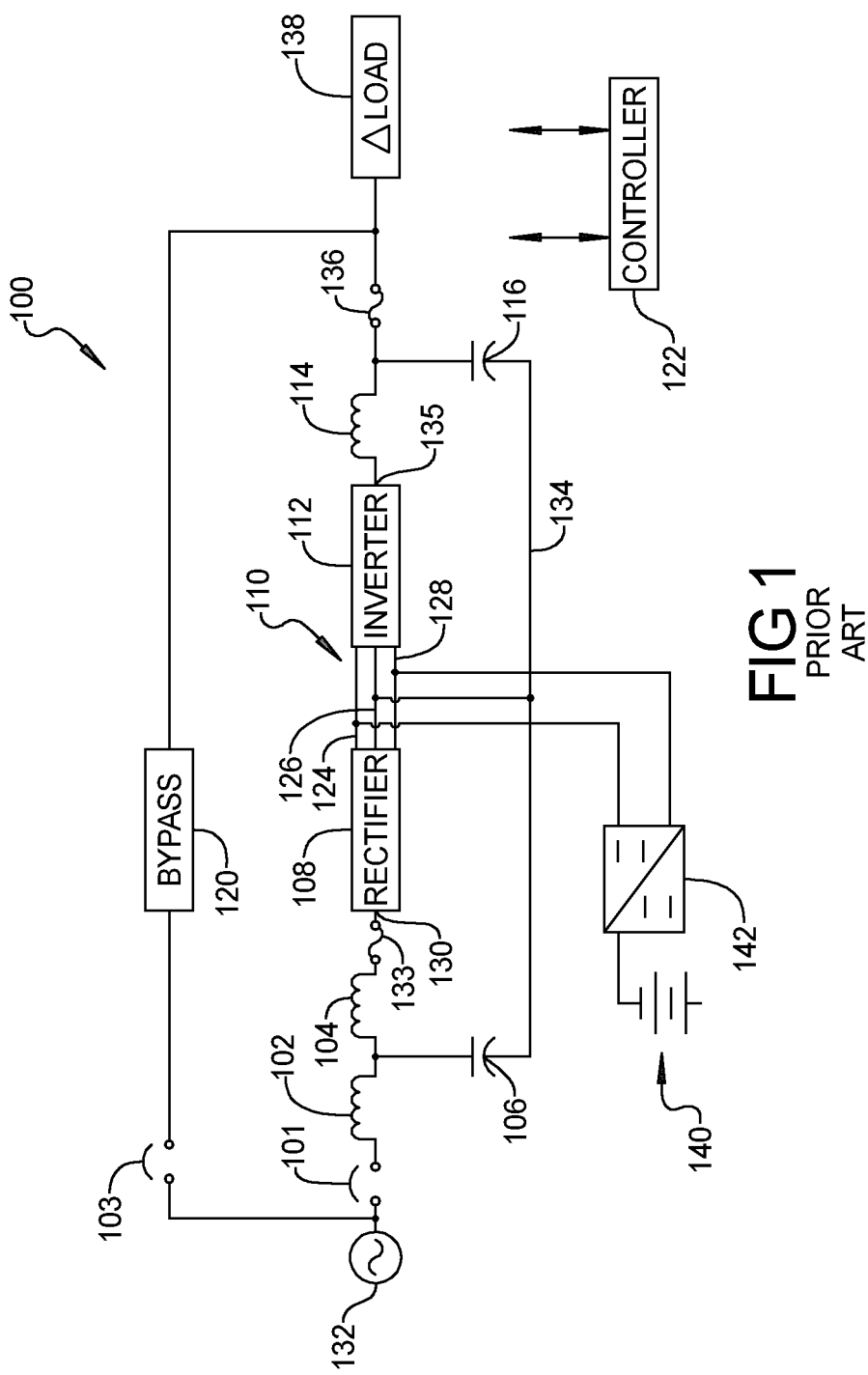
FIG. 1 is a simplified block diagram of a prior art 3 phase transformer-less double conversion UPS system.

In accordance with an aspect of the present disclosure, a transformer-less UPS system is controlled to mitigate an AC input voltage surge. While this control is described with reference to prior art UPS system 100 shown in FIG. 1, it should be understood that this control is not in the prior art.

When AC power source 132 fails, circuit breaker 101 is still closed and rectifier 108 will be off. When AC power source 132 returns to operation, or a back-up generator kicks in, there is sometimes a large AC input voltage surge at the input 130 of rectifier 108. This large voltage surge pumps up the voltage level of DC bus 110 through the diodes of the IGBTs 146 (FIG. 2) to a much higher level than a nominal operating voltage of DC bus 110 which can cause damages to other devices connected to DC bus 110.

It should be understood that as used herein, DC bus target voltage means the DC voltage for the DC bus that the rectifier is operated to regulate the DC bus at. As is known in the art, a UPS system has a nominal DC bus voltage that is the DC bus target voltage that the rectifier is operated to regulate the DC bus at during normal operation of the UPS system.

Figure 3A:
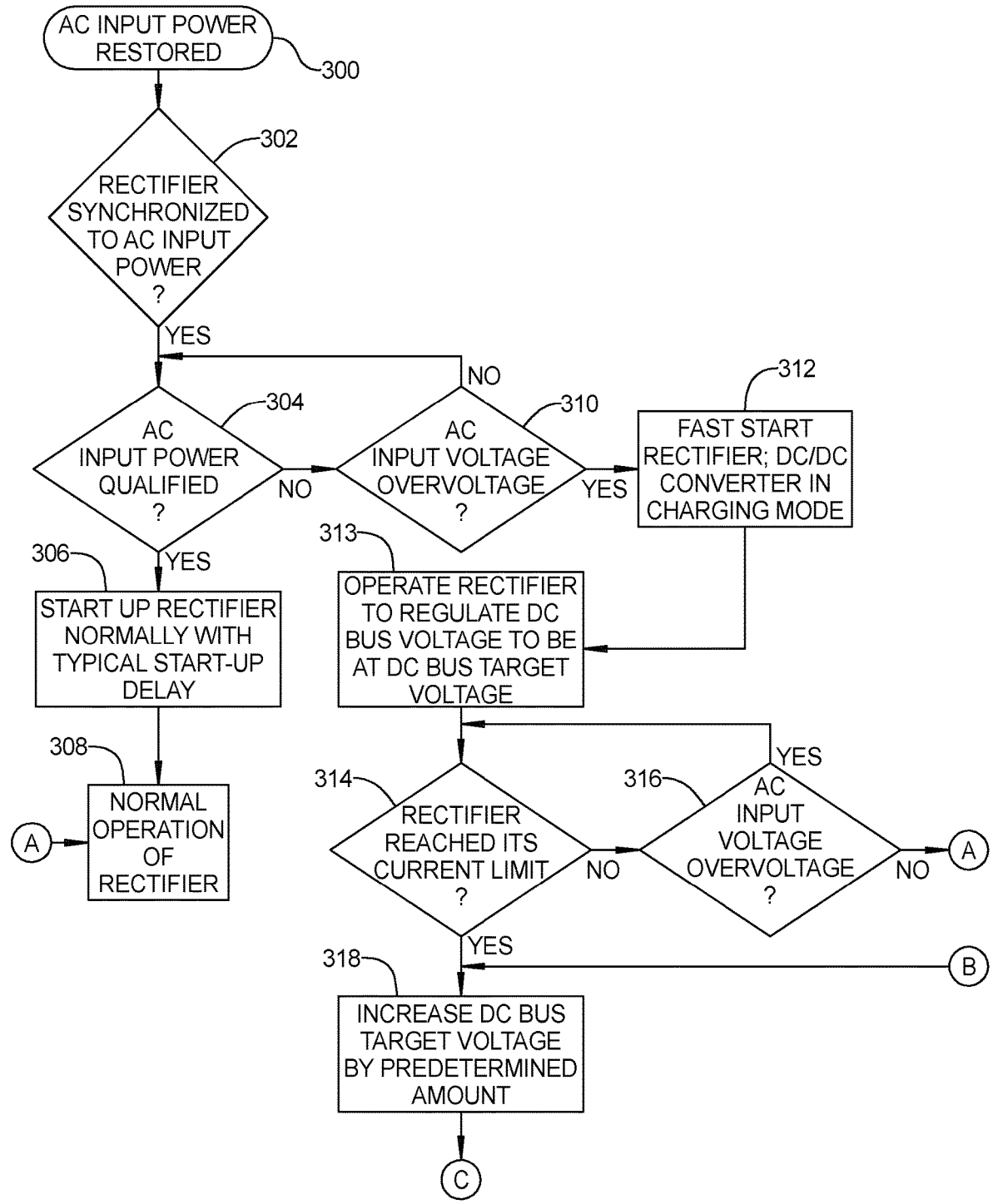
FIGS. 3A-3B show a flow chart of a control routine for the control of the UPS system of FIG. 1 to mitigate AC input voltage surge in accordance with an aspect of the present disclosure.
Figure 3B:
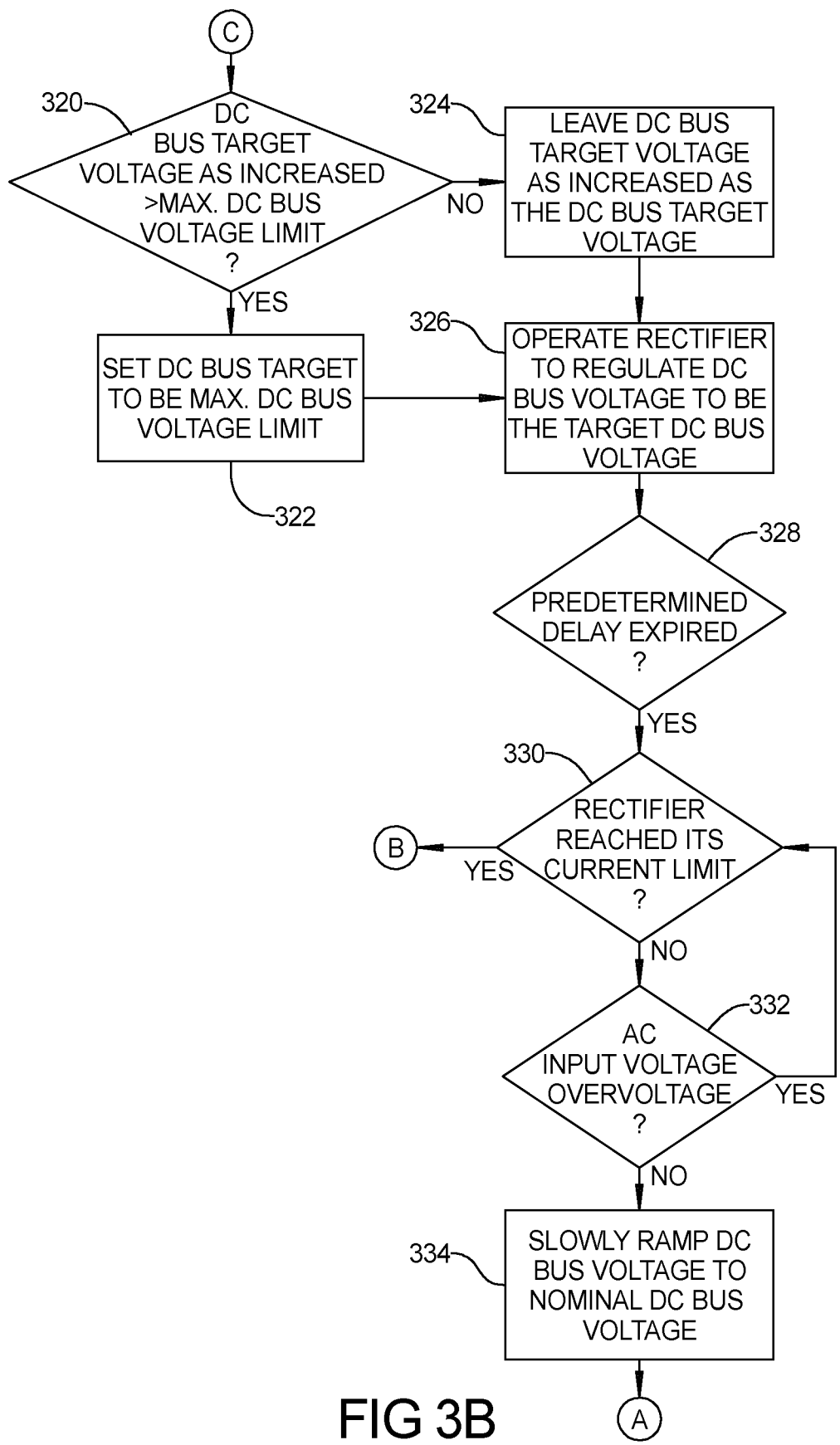

FIGS. 3A-3B show a flow chart of an illustrative control routine for operation of rectifier 108 when AC input power from AC power source 132 is restored to mitigate AC input voltage surge. This control routine is implemented in controller 122, such as in software. The control routine starts at 300 when AC input power from AC power source 132 is restored. At 302 the control routine checks whether rectifier 108 has synchronized to the AC input from AC power source 132. If not, the control routine branches back to 302. If rectifier 108 has synchronized to the AC input power, the control routine proceeds to 304 where it checks whether the AC input power is qualified—whether it is within specification. If the AC input power is qualified, the control routine proceeds to 306 where rectifier 108 is started up normally with typical start-up delay (e.g., several hundred msec.) and then proceeds to 308 where rectifier 108 is operated normally.

If at 304 the AC input power is not qualified, the control routine branches to 310 where it checks whether the AC input voltage of the AC input power is overvoltage. If not, the control routine branches back to 304. If the AC input voltage is overvoltage, the control routine proceeds to 312 where it fast starts rectifier 108 (the typical start-up delay reduced significantly such as by 50%) and puts DC/DC converter 142 into its charging mode. The control routine then proceeds to 313 where it operates rectifier 108 to regulate the DC voltage of the DC bus to be at the DC bus target voltage. The control routine then proceeds to 314 where it checks whether rectifier 108 has reached its current limit. The current limit of rectifier 108 is a user setting that sets the maximum current that rectifier 108 can source while operating normally. Typically, the current limit of rectifier 108 is determined by the maximum current rating of the IGBT switching devices 146. If rectifier 108 has not reached its current limit, the control routine branches to 316 where it checks whether the AC input voltage is still overvoltage. If the AC input voltage is still overvoltage, the control routine branches back to 314. If the AC input voltage is no longer overvoltage, the control routine branches to 308 where rectifier 108 is operated normally.

If at 314 rectifier 108 has reached its current limit, the control routine proceeds to 318 where it increases the DC bus target voltage by a predetermined amount, such as ten volts. The control routine then proceeds to 320 where it checks whether the DC bus target voltage as increased exceeds a maximum DC bus voltage limit. If the DC bus target voltage as increased exceeds the maximum DC bus voltage limit, the control routine branches to 322 where it sets the DC bus target voltage to be the maximum DC bus voltage limit and proceeds to 326. If at 320 the DC bus target voltage as increased does not exceed the maximum DC bus voltage limit, the control routine branches to 324 where it leaves as the DC bus target voltage the DC bus target voltage as it was increased and then proceeds to 326. At 326, the control routine operates rectifier 108 to regulate the DC voltage of the DC bus to be at the DC bus target voltage. The control routine then proceeds to 328 where it waits until a predetermine delay has expired and then proceeds to 330. At 330 the control routine checks whether rectifier 108 being operated to regulate the DC bus at the DC bus target voltage has reached its current limit. If rectifier 108 has reached its current limit, the control routine branches back to 318 where it again increases the DC bus target voltage by the predetermined amount such as 10 volts and continues to 320. If at 330 rectifier 108 has not reached its maximum current limit, the control routine branches to 332 where it checks whether the AC input voltage is still overvoltage. If the AC input voltage is still overvoltage, the control routine branches back to 330. If at 332 the AC input voltage is not overvoltage, the control routine branches to 334 where it operates rectifier 108 to slowly ramp down the DC bus voltage to the nominal DC bus target voltage and then proceeds to 308 where rectifier 108 is operated normally.

It should be understood that the logic for the foregoing control of UPS system 100 by controller 122 illustratively can be implemented in hardware logic, software logic, or a combination of hardware and software logic. In this regard, controller 122 can be or can include any of a digital signal processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPLD), or application specific integrated circuit (ASIC). When it is stated that controller 122 performs a function or is configured to perform a function, it should be understood that controller 122 is configured to do so with appropriate logic (such as in software, logic devices, or a combination thereof).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of mitigating effects of a voltage surge in an AC input voltage to a rectifier of a transformer-less rectifier uninterruptible power supply system that occurs when AC power is restored to an input of the rectifier after an outage wherein the uninterruptible power supply has a DC bus and associated DC bus target voltage, comprising:
    a. determining with a controller if the AC input voltage is overvoltage and if the AC input voltage is not overvoltage, have the rectifier operated normally; and
    b. if the AC input voltage is overvoltage:
        i. operating the rectifier with the controller to regulate the DC bus to be at the DC bus target voltage until the voltage surge has passed unless the controller determines that the rectifier has reached a current limit of the rectifier;
        ii. if the rectifier reaches the current limit of the rectifier, increasing the DC bus target voltage with the controller by a predetermined amount, then determining with the controller if the DC bus target voltage as increased will exceed a maximum voltage limit of the DC bus and if the DC bus target voltage as increased by the predetermined amount will exceed the maximum voltage limit of the DC bus then setting with the controller the DC bus target voltage to be the maximum voltage limit of the DC bus and if the DC bus target voltage as increased does not exceed the maximum voltage limit of the DC bus then leaving the DC bus target voltage as increased as the DC bus target voltage;
        iii. next operating the rectifier to regulate the DC bus to be at the DC bus target voltage for a predetermined period of time; and
        iv. after the predetermined period of time, checking with the controller if the AC voltage input is still overvoltage and if the AC input voltage is still overvoltage, repeating steps (b)(i)-(iv) and if the AC input voltage is no longer overvoltage, controlling the rectifier with the controller to ramp the DC bus voltage down to a nominal DC voltage and then having the rectifier operated normally.

2. The method of claim 1 wherein if the AC input voltage is overvoltage when AC power is first restored, further having the controller operate the rectifier to have a fast start and operate a DC/DC converter of the uninterruptible power supply system in a charge mode.

* * * * *